(12) United States Patent
Lyu et al.

(10) Patent No.: US 8,169,532 B2
(45) Date of Patent: May 1, 2012

(54) PORTABLE ELECTRONIC DEVICE AND METHOD FOR MEASURING DISTANCE BY PERFORMING AUTO FOCUS FUNCTION

(75) Inventors: Szu-Hao Lyu, Taipei (TW); Chien-Nan Yu, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 337 days.

(21) Appl. No.: 12/617,323

(22) Filed: Nov. 12, 2009

(65) Prior Publication Data

US 2011/0075017 A1  Mar. 31, 2011

(30) Foreign Application Priority Data

Sep. 25, 2009  (TW) ................................ 98132389 A

(51) Int. Cl.
*H04N 5/232* (2006.01)
*G03B 13/00* (2006.01)

(52) U.S. Cl. ....................................... 348/345; 348/348

(58) Field of Classification Search .................. 348/345, 348/346, 348, 350
See application file for complete search history.

(56) References Cited

U.S. PATENT DOCUMENTS

| 7,995,131 | B2 * | 8/2011 | Yeh ................................ 348/345 |
| 2003/0011692 | A1 * | 1/2003 | Shore et al. ................. 348/240.3 |
| 2003/0044066 | A1 * | 3/2003 | Sakaguchi .................... 382/168 |
| 2003/0090567 | A1 * | 5/2003 | Sasaki et al. .................. 348/136 |
| 2008/0317453 | A1 * | 12/2008 | Yuyama ........................ 396/104 |
| 2009/0167930 | A1 * | 7/2009 | Safaee-Rad et al. .......... 348/347 |
| 2009/0190023 | A1 * | 7/2009 | Mise et al. .................... 348/345 |

* cited by examiner

*Primary Examiner* — Kelly L Jerabek

(74) *Attorney, Agent, or Firm* — Kirton McConkie; Evan R. Witt

(57) ABSTRACT

A portable electronic device for measuring a distance of an object by performing an auto focus function and a distance measuring method are provided. The portable electronic device includes an image pickup module and a distance measuring program. The image pickup module includes a lens, an optical sensing element and a transmission mechanism. The distance measuring program includes a distance look-up table. The distance look-up table is established by correlating a plurality of lens moving step numbers with corresponding object distance values. The auto focus function is performed to capture an image of an object by the image pickup module, thereby obtaining a current lens moving step number required for performing the auto focus function. A current object distance value corresponding to the current lens moving step number is acquired according to the distance look-up table.

8 Claims, 7 Drawing Sheets

PORTABLE ELECTRONIC DEVICE AND METHOD FOR MEASURING DISTANCE BY PERFORMING AUTO FOCUS FUNCTION

FIELD OF THE INVENTION

The present invention relates to a portable electronic device, and more particularly to a portable electronic device for measuring a distance of an object by performing an auto focus function.

BACKGROUND OF THE INVENTION

Image pickup devices such as digital cameras and camera phones are widely used to take photographs. As known, the definition of the object taken by the image pickup device is largely effected by the focusing operation of the image pickup device. In order to achieve high image quality of the object, the focal length should be properly adjusted. In other words, the quality of the image pickup device is highly dependent on the auto focus method applied to the digital camera.

Generally, the auto focus methods are classified into two types, i.e. an active auto focus method and a passive auto focus method. Since the active auto focus method needs extra detector and beam projector, the cost of the digital camera is increased. In other words, the passive auto focus method is more popular.

FIG. 1 is a flowchart illustrating a passive auto focus method for use in a portable electronic device according to the prior art. For performing the passive auto focus method, the lens of the image pickup device is moved to different focusing positions by different lens step numbers, and the focus values at different positions are analyzed in order to discriminate whether the image is sharp or blurred. Hereinafter, the passive auto focus method will be illustrated in more details with reference to FIG. 1. First of all, the lens of the portable electronic device is moved to a first position by a lens step number, and then the image of the object corresponding to the first position of the lens is captured (Step S1). Then, the focus value of the image is calculated (Step S2). If this focus value is the maximum focus value (Step S3), the auto focus method is finished. Otherwise, the lens is moved to a next position by a next lens step number (Step S4), and the Step S1, S2 and S3 are repeatedly done until the maximum focus value is searched.

Moreover, a portable electronic device for measuring a distance of an object by performing an auto focus function has been disclosed in the prior art. FIG. 2A is a schematic perspective view illustrating the outward appearance of a portable electronic device for measuring distance according to the prior art. FIG. 2B is a schematic perspective view illustrating the outward appearance of the portable electronic device of FIG. 2A and taken from another viewpoint. As shown in FIGS. 2A and 2B, the portable electronic device 1 is a camera phone. The portable electronic device 1 comprises a display screen 11, an image pickup module 12 and a computing unit 13. The image pickup module 12 is used for capturing an image of an object T (see FIG. 3).

FIG. 3 is a schematic diagram illustrating an object imaged by an image pickup module of a conventional portable electronic device. As shown in FIG. 3, the image pickup module 12 comprises a lens 121, a transmission mechanism 122 and an optical sensing element 123. The transmission mechanism 122 is connected to the lens 121 for moving the lens 121 during the auto focus method is done. The object T is focused by the lens 121, thereby generating an image on the optical sensing element 123. The image pickup module 12 has a focal length f. The distance from the optical sensing element 123 to the lens 121 indicates an image distance q. The distance from the object T to the lens 121 indicates an object distance p. For acquiring the objective distance p, the object T needs to be shot by the image pickup module 12 of the portable electronic device 1 according to an auto focus method. For performing the auto focus method, the transmission mechanism 122 generates motive power to move the lens 121. Until the lens 121 is moved to a position having a maximum focus value, the object T is shot by the image pickup module 12, thereby generating an image I on the optical sensing element 123. Since the focal length f and the image distance q are known, the objective distance p could be obtained according to a Gaussian imaging formula (i.e. $1/p+1/q=1/f$). In addition, the information associated with the object distance p could be shown on the display screen 11 to be viewed by the user.

As previously described, the distance of the object from the portable electronic device 1 is acquired by firstly obtaining the image distance q according to an auto focus technology and then using the computing unit 13 to compute according to the Gaussian imaging formula. Since the portable electronic device 1 could measure the object distance p after the computation of the computing unit 13 is completed, the use of the portable electronic device 1 to measure the object distance p is time-consuming. On the other hand, the computation of the computing unit 13 usually results in a resource contention problem of the portable electronic device 1, and thus the performance of the portable electronic device 1 is deteriorated.

SUMMARY OF THE INVENTION

The present invention to provide a portable electronic device for quickly measuring a distance of an object.

The present invention also provides a method for measuring a distance of an object by performing an auto focus function.

In accordance with an aspect of the present invention, there is provided a distance measuring method for use in a portable electronic device having an auto focus function. The portable electronic device includes an image pickup module. The image pickup module has a lens. Firstly, a distance look-up table is established by correlating a plurality of lens moving step numbers with corresponding object distance values. Next, the auto focus function is performed to capture an image of an object by the image pickup module of the portable electronic device, thereby obtaining a current lens moving step number required for performing the auto focus function. Next, the current object distance value corresponding to the current lens moving step number is acquired according to the distance look-up table.

In an embodiment, the distance look-up table includes a near distance threshold value. If the current lens moving step number is larger than the near distance threshold value, the current object distance value corresponding to the current lens moving step number is acquired according to a Gaussian imaging formula. Whereas, if the current lens moving step number is smaller than or equal to the near distance threshold value, the current object distance value corresponding to the current lens moving step number is acquired according to a practical measurement.

In an embodiment, the Gaussian imaging formula is expressed as: $1/p+1/q=1/f$, where p is a distance from the object to the lens, q is a distance from the image of the object to the lens, and f is a focal length of the portable electronic device.

In an embodiment, the image pickup module further includes a transmission mechanism and an optical sensing element. The transmission mechanism is connected to the lens for moving the lens during the auto focus function of the portable electronic device is performed. The optical sensing element is arranged beside the lens. The image of the object is projected on the optical sensing element.

In an embodiment, the portable electronic device further includes a display screen for showing the current object distance value corresponding to the current lens moving step number.

In an embodiment, the portable electronic device is a digital camera or a camera phone.

In accordance with another aspect of the present invention, there is provided a portable electronic device for measuring a distance of an object by performing an auto focus function. The portable electronic device includes an image pickup module and a distance measuring program. The image pickup module performs the auto focus function to capture the image of the object. The image pickup module includes a lens, an optical sensing element and a transmission mechanism. The lens is movable during the auto focus function is performed. The optical sensing element is arranged beside the lens. The image of the object is projected on the optical sensing element. The transmission mechanism is connected to the lens for moving the lens during the auto focus function of the portable electronic device is performed. The distance measuring program is used for acquiring an object distance value during the image pickup module performs the auto focus function to capture the image of the object. The distance measuring program includes a distance look-up table that is established by correlating a plurality of lens moving step numbers with corresponding object distance values. The lens is moved by the transmission mechanism during the image pickup module performs the auto focus function to capture the image of the object, so that the distance measuring program obtains a current lens moving step number required for performing the auto focus function. A current object distance value corresponding to the current lens moving step number is acquired according to the distance look-up table.

In an embodiment, the distance look-up table includes a near distance threshold value. If the current lens moving step number is larger than the near distance threshold value, the current object distance value corresponding to the current lens moving step number is acquired according to a Gaussian imaging formula. Whereas, if the current lens moving step number is smaller than or equal to the near distance threshold value, the current object distance value corresponding to the current lens moving step number is acquired according to a practical measurement.

In an embodiment, the Gaussian imaging formula is expressed as: $1/p + 1/q = 1/f$, where p is a distance from the object to the lens, q is a distance from the image of the object to the lens, and f is a focal length of the portable electronic device.

In an embodiment, the portable electronic device further includes a display screen for showing the current object distance value corresponding to the current lens moving step number.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
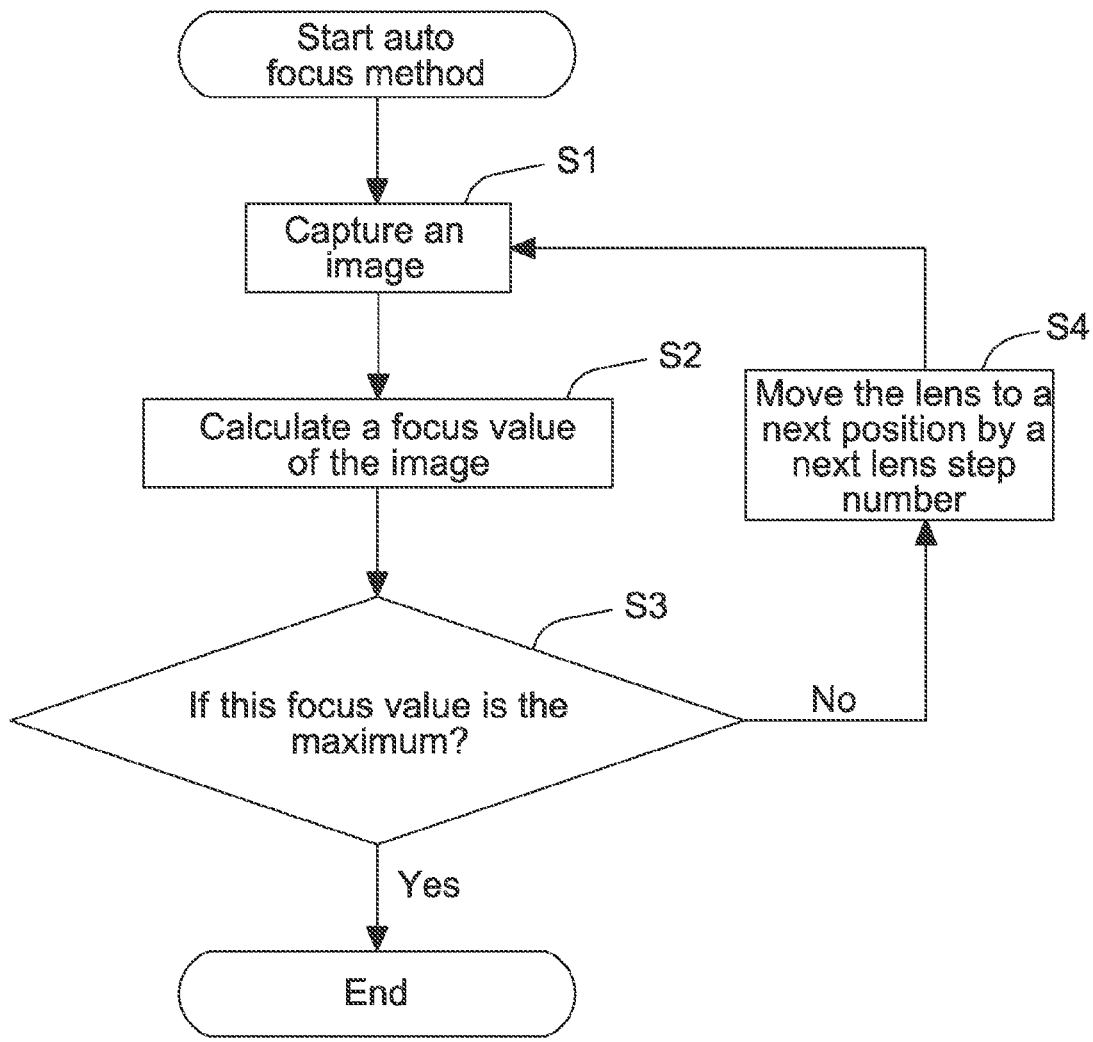
FIG. 1 is a flowchart illustrating a passive auto focus method for use in a portable electronic device according to the prior art.
Figure 2B:
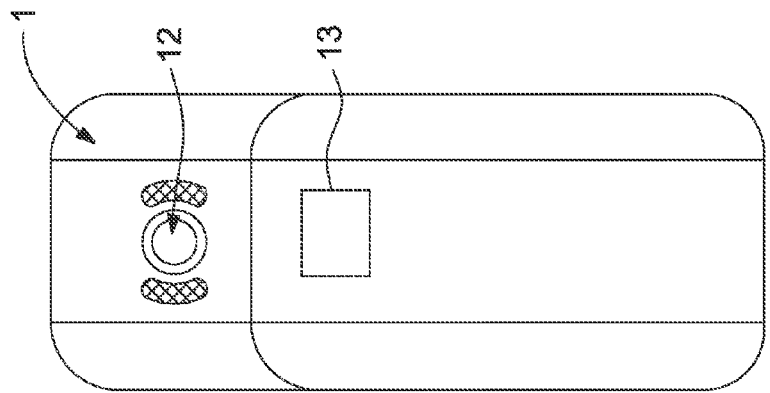
FIG. 2B is a schematic perspective view illustrating the outward appearance of the portable electronic device of FIG. 2A and taken from another viewpoint.
Figure 2A:
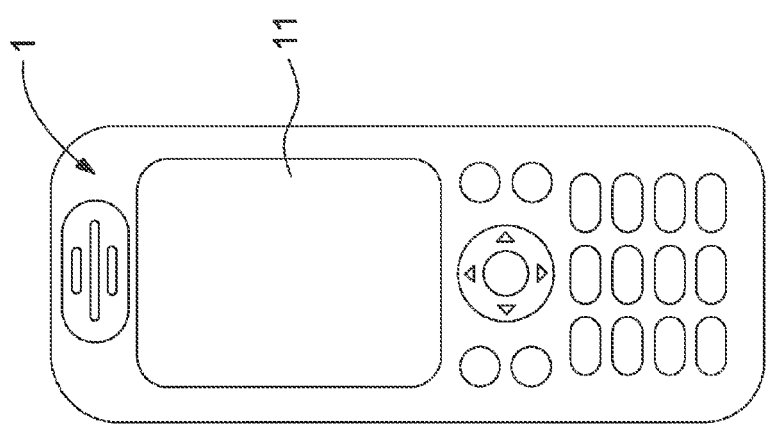
FIG. 2A is a schematic perspective view illustrating the outward appearance of a portable electronic device for measuring distance according to the prior art.
Figure 3:
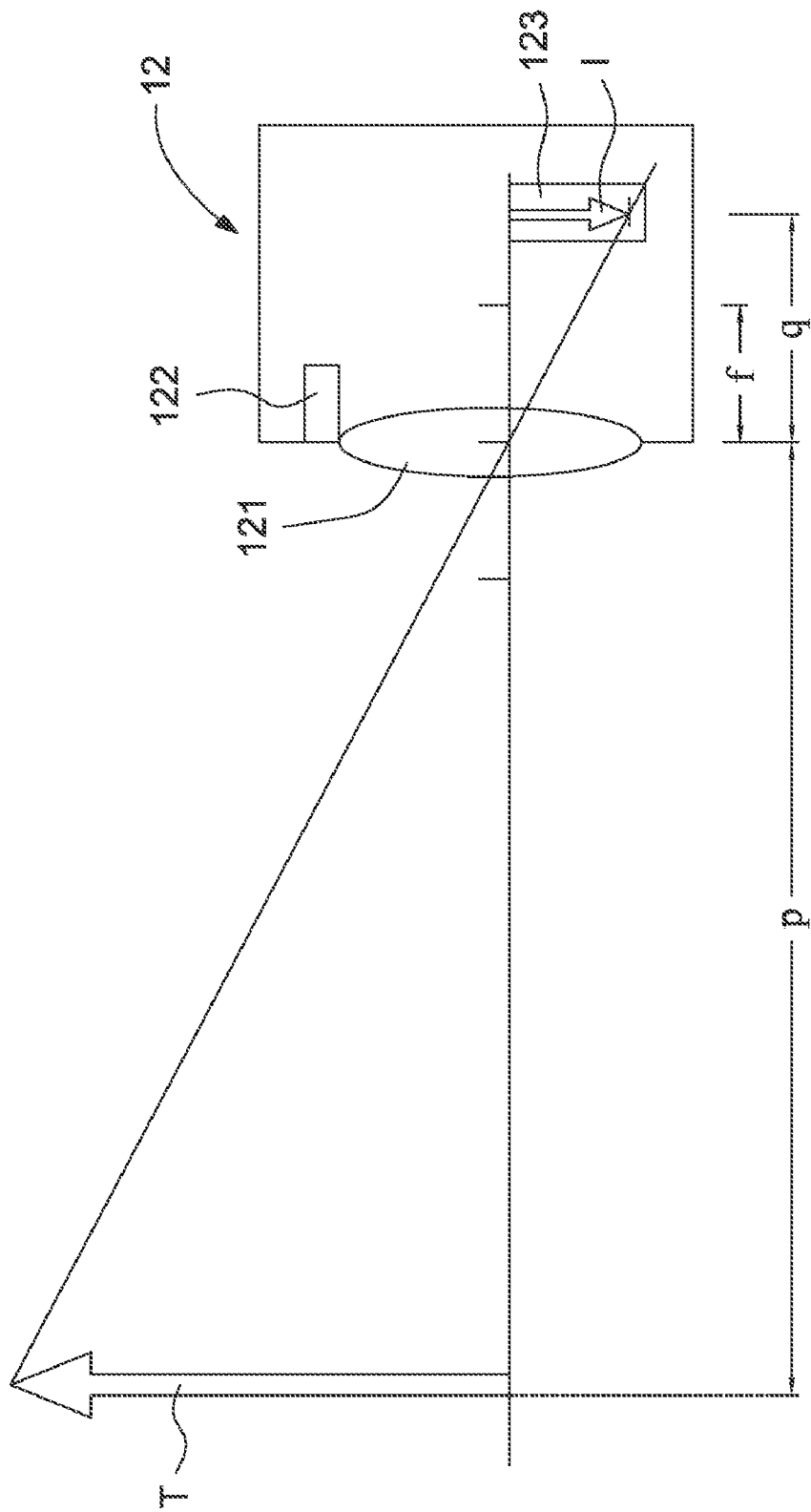
FIG. 3 is a schematic diagram illustrating an object imaged by an image pickup module of a conventional portable electronic device.
Figure 4:
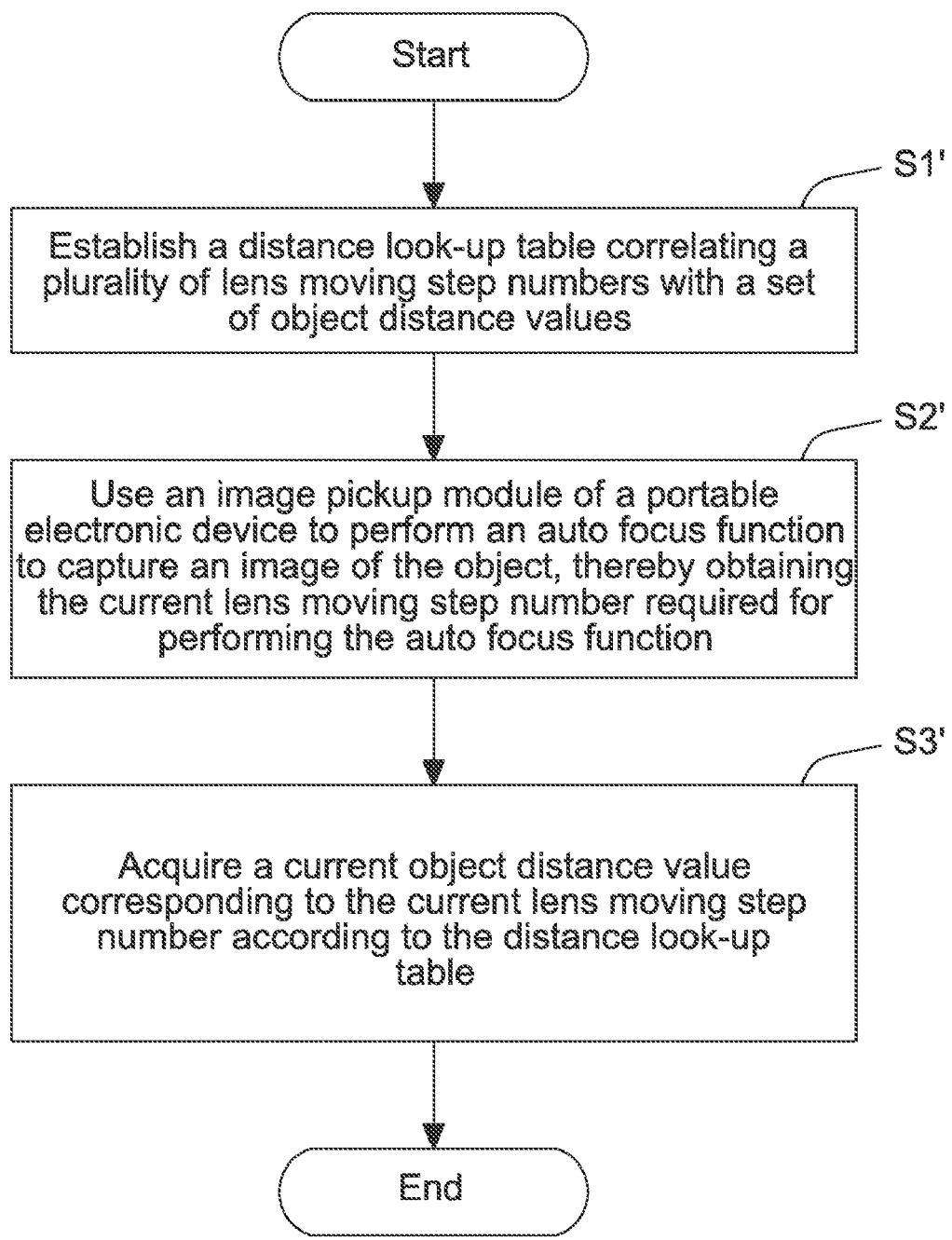
FIG. 4 is a flowchart illustrating a distance measuring method by performing an auto focus function according to an embodiment of the present invention.

For obviating the drawbacks encountered from the prior art, the present invention provides a distance measuring method by performing an auto focus function. FIG. 4 is a flowchart illustrating a distance measuring method by performing an auto focus function according to an embodiment of the present invention. First of all, a distance look-up table correlating a plurality of lens moving step numbers with a set of object distance values is established (Step S1'). The procedure of establishing the distance look-up table will be illustrated in more details later. Next, an image pickup module of a portable electronic device performs an auto focus function to capture an image of the object, and the current lens moving step number required for performing the auto focus function is obtained (Step S2'). After the current lens moving step number is obtained, a current object distance value corresponding to the current lens moving step number is acquired according to the distance look-up table (Step S3'). Meanwhile, the distance of the object from the portable electronic device is measured.

Figure 5B:
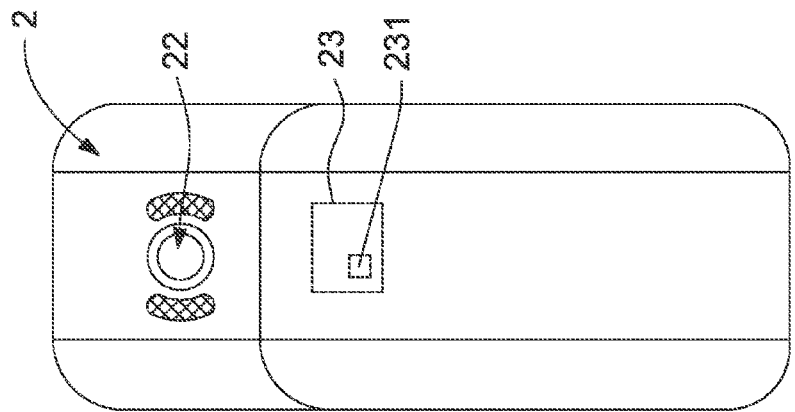
FIG. 5B is a schematic perspective view illustrating the outward appearance of the portable electronic device of FIG. 5A and taken from another viewpoint.
Figure 5A:
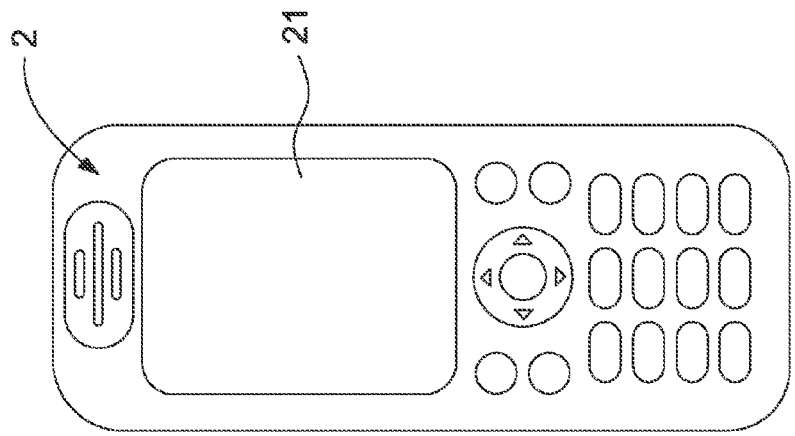
FIG. 5A is a schematic perspective view illustrating the outward appearance of a portable electronic device using the distance measuring method of the present invention.

The distance measuring method of the present invention could be applied to a portable electronic device. FIG. 5A is a schematic perspective view illustrating the outward appearance of a portable electronic device using the distance measuring method of the present invention. FIG. 5B is a schematic perspective view illustrating the outward appearance of the portable electronic device of FIG. 5A and taken from another viewpoint. As shown in FIGS. 5A and 5B, the portable electronic device 2 comprises a display screen 21, an image pickup module 22 and a distance measuring program 23. The image pickup module 22 is used for capturing an image of an object T (see FIG. 6). The distance measuring program 23 has a distance look-up table 231. After the image pickup module 22 performs an auto focus function to capture the image of the object T and the lens moving step number of the image pickup module 22 required for performing the auto focus function are obtained, the distance measuring program 23 will measure the distance of the object from the lens according to the distance look-up table 231. In this embodiment, the portable electronic device 2 is a camera phone. In some embodiments, the portable electronic device 2 is digital camera.

In the distance measuring method of the present invention, a distance look-up table 231 is firstly established, then the image pickup module 22 is used to perform an auto focus function to capture the image of the object and obtain the lens moving step number, and finally the object distance corresponding to the lens moving step number is acquired according to the distance look-up table 231. In other words, the procedure of establishing the distance look-up table 231 is very critical in the distance measuring method of the present invention.

Figure 6A:
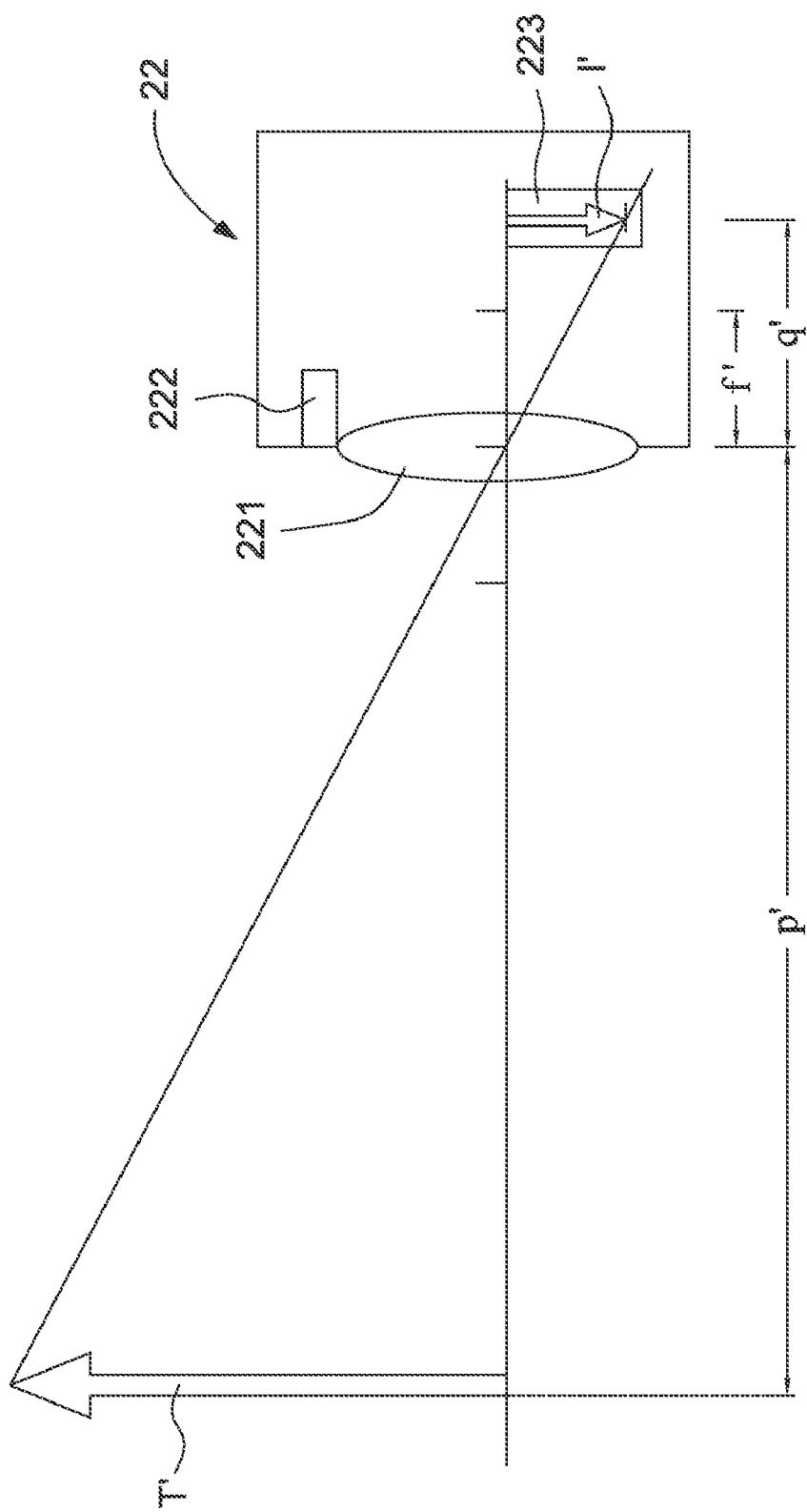
FIGS. 6A and 6B are schematic diagrams illustrating an object imaged by an image pickup module of the portable electronic device of the present invention.
Figure 6B:
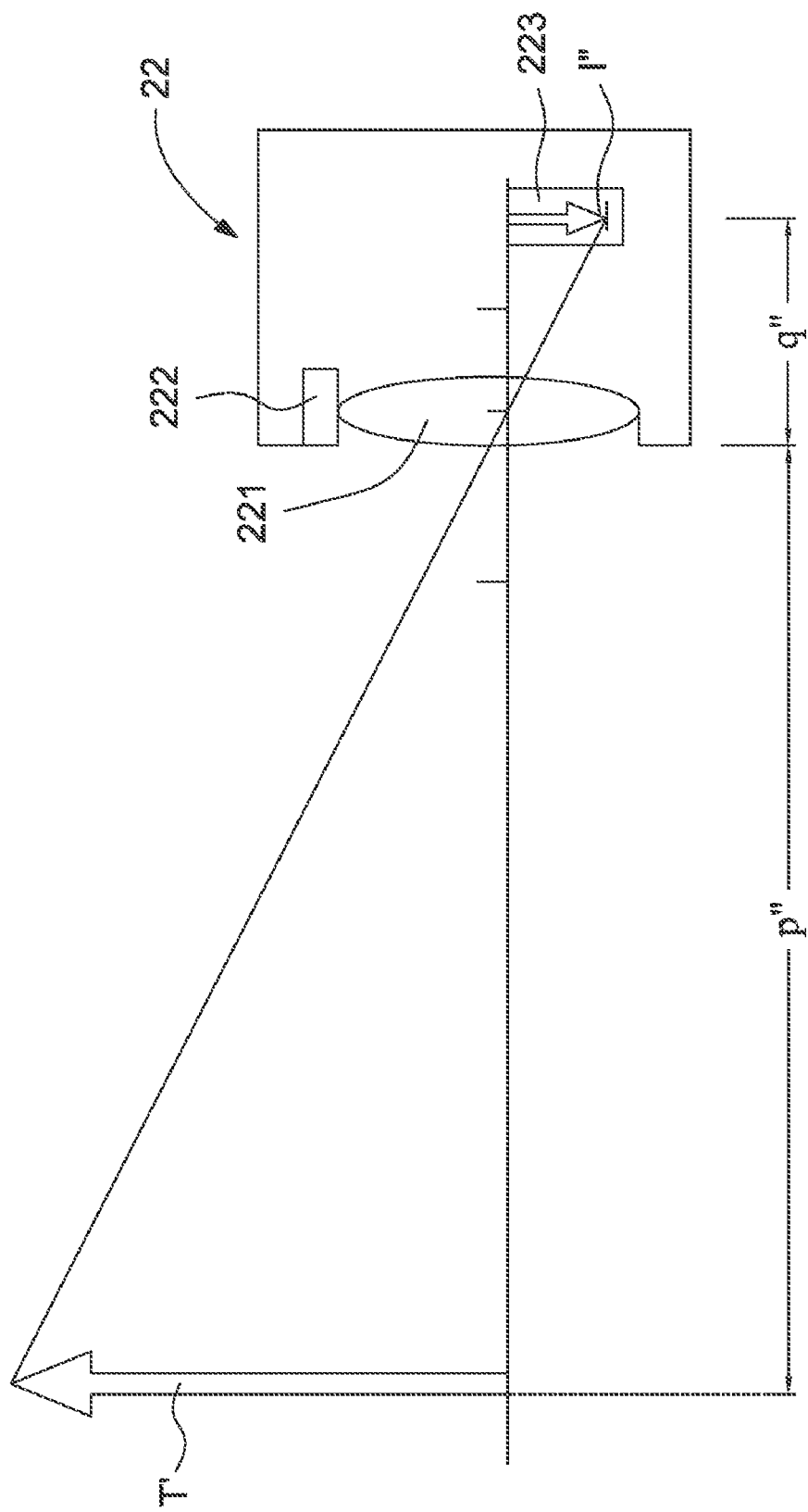

Hereinafter, a procedure of establishing the distance look-up table 231 will be illustrated with reference to FIGS. 6A and 6B. FIGS. 6A and 6B are schematic diagrams illustrating an object imaged by an image pickup module of the portable electronic device of the present invention. As shown in FIG. 6A, the image pickup module 22 comprises a lens 221, a transmission mechanism 222 and an optical sensing element 223. The transmission mechanism 222 is connected to the lens 221 for moving the lens 221 during the auto focus method is done. The object T' is focused by the lens 221, thereby generating an image on the optical sensing element 223. The image pickup module 22 has a known focal length f'. An example of the optical sensing element 223 is a charge coupled device (CCD).

For establishing the distance look-up table 231, the distance from the optical sensing element 223 or the image I' to the lens 221 (i.e. an image distance q') should be obtained in advance. Next, the object T' is placed at a location in front of the image pickup module 22. The distance from the object T' to the lens 221 is defined as an object distance p'. After the object distance p' is measured, the value of the object distance p' is known. Next, the image pickup module 22 performs an auto focus function to capture the image of the object, and the lens 221 is moved by the transmission mechanism 222. Until the lens 221 is moved to a position having a maximum focus value, the object T' is shot by the image pickup module 22, thereby generating an image I' on the optical sensing element 223. Since the focal length f' and the object distance p' are known, the image distance q' could be obtained according to the Gaussian imaging formula (i.e. $1/p+1/q=1/f$). By the way, since the image I' is generated on the same side of the optical sensing element 223 (or at the right side of the lens 221), the image distance q' has a positive value according to the Gaussian imaging formula; and since the object T' is far from the side of the optical sensing element 223 (or at the left side of the lens 221), the object distance p' has a negative value according to the Gaussian imaging formula.

Assuming that the lens 222 is permitted to be moved by n steps and the overall moving distance of the lens 222 is d with respect to an infinite position, the moving distance of the lens 222 per step is equal to d/n. Next, the object T' is placed at a location in front of the image pickup module 22. The distance from the object T' to the lens 221 is defined as an object distance p'', which is unknown. Next, the image pickup module 22 performs an auto focus function to capture the image of the object, and the lens 221 is moved by the transmission mechanism 222. Until the lens 221 is moved to a position having a maximum focus value, the object T' is shot by the image pickup module 22, thereby generating an image I'' on the optical sensing element 223 (see FIG. 6B). Meanwhile, the lens moving step number x is obtained, so that the lens moving step number x is known. The lens moving step number x indicates the number of steps of the lens 221 required for performing the auto focus function. As the lens 221 is moved by the lens moving step number x, the image lens q'' is changed to (q'−x×d/n).

Since the focal length f' and the image lens q'' are known, the object distance q'' could be obtained according to the Gaussian imaging formula (i.e. $1/p+1/q=1/f$). The above procedures are repeatedly done by changing the position of the object T', a plurality of lens moving step numbers and the corresponding object distance values will be obtained. The lens moving step numbers and the corresponding object distance values could be listed in an exemplary distance look-up table 231 as follows:

| lens moving step number | Object distance |
|---|---|
| 1 | $p_1''$ |
| 2 | $p_2''$ |
| th − 1 | $p_{th-1}''$ |
| th | $p_{th}''$ |
| th + 1 | $p_{th+1}''$ |
| n − 1 | $p_{n-1}''$ |
| n | $p_n''$ |

From the above description, the portable electronic device 2 of the present invention is capable of measuring the distance of the object T' by using the image pickup module 22 to perform an auto focus function to capture the image of the object and obtain the lens moving step number x and using the distance measuring program 23 to search an object distance $P_{x''}$ corresponding to the lens moving step number x from the distance look-up table 231. By undue experiments, it was found that, when the object is auto-focused at a near distance, the error of the measured distance is usually beyond an allowable range by using the Gaussian imaging formula or using the distance look-up table 231 that is established according to the Gaussian imaging formula. That is, the distance fails to be actually measured when the object is auto-focused at a near distance.

For increasing the accuracy of measuring the distance, the distance look-up table includes a near distance threshold value th in the lens moving step number column. In a case that the moving step number of the lens 221 (e.g. the current lens moving step number) is equal to the near distance threshold value th, it is meant that the object T' focused by the lens 221 is located within a near distance. That is, if the current lens moving step number is smaller than or equal to the near distance threshold value th, the object T' is located within the near distance. Whereas, if the current lens moving step number is larger than the near distance threshold value th, the object T' is beyond the near distance. For increasing the accuracy of measuring the distance, if the current lens moving step number is smaller than or equal to the near distance threshold value th, the object distance values $p_1''$~$p_{th-1}''$ are acquired according to the Gaussian imaging formula but the object distance values $p_{th}''$~$p_n''$ are acquired according to practical measurements. After the object distance values $p_1''$~$p_n''$ are obtained, the distance look-up table 231 is established (Step S1').

Please refer to FIG. 6B and the distance look-up table 231 again. For measuring a distance of the object T' by the portable electronic device 2, the image pickup module 222 performs an auto focus function to obtain correct focus on the object T', so that the current lens moving step number x of the image pickup module required for performing the auto focus function is obtained (Step S2'). Assuming that the lens 222 is moved by two steps, the current lens moving step number x is 2. After the current lens moving step number (x=2) is obtained, a current object distance value $p_2''$ corresponding to the current lens moving step number of the lens is acquired according to the distance look-up table 231 (Step S3'). Meanwhile, the distance of the object from the portable electronic device is measured. After the current object distance value is obtained, the current object distance value could be shown on the display screen 21 to be viewed by the user.

By the way, the lens moving step numbers and the corresponding object distance values included in the distance look-up table are obtained in relation to a certain focal length of the image pickup module. In a case that the image pickup module performs the auto focus function with a second focal length, the lens moving step numbers and the corresponding object distance values included in the distance look-up table are obtained in relation to the second focal length.

From the above description, the distance measuring method of the present invention is capable of measuring a distance from an object to a portable electronic device by performing an auto focus function. After a distance look-up table is established, the image pickup module of the portable electronic device may perform the auto focus function to capture an image of the object, thereby obtaining a current lens moving step number required for performing the auto focus function. According to the distance look-up table, a current object distance value corresponding to the current lens moving step number will be acquired. In other words, the distance measuring method of the present invention could measure the distance without the time-consuming computation. In comparison with the prior art, the distance measuring method of the present invention is relatively time-saving. Moreover, since the object distance values included in the distance look-up table are predetermined, the accuracy of measuring the distance of the object at a near distance is usually unsatisfied. For increasing the accuracy of measuring the distance, the object distance values at the near distance could be obtained according to the practical requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A distance measuring method for use in a portable electronic device having an auto focus function, said portable electronic device comprising an image pickup module, said image pickup module having a lens, said distance measuring method comprising steps of:
    establishing a distance look-up table by correlating a plurality of lens moving step numbers with corresponding object distance values;
    performing said auto focus function to capture an image of an object by said image pickup module of said portable electronic device, thereby obtaining a current lens moving step number required for performing said auto focus function; and
    acquiring a current object distance value corresponding to said current lens moving step number according to said distance look-up table,
    wherein said distance look-up table includes a near distance threshold value, wherein if said current lens moving step number is larger than said near distance threshold value, said current object distance value corresponding to said current lens moving step number is acquired according to a Gaussian imaging formula, and if said current lens moving step number is smaller than or equal to said near distance threshold value, said current object distance value corresponding to said current lens moving step number is acquired according to a practical measurement.

2. The distance measuring method according to claim 1 wherein said Gaussian imaging formula is expressed as: $1/p + 1/q = 1/f$, where p is a distance from said object to said lens, q is a distance from said image of said object to said lens, and f is a focal length of said portable electronic device.

3. The distance measuring method according to claim 1 wherein said image pickup module further comprises:
    a transmission mechanism connected to said lens for moving said lens while said auto focus function of said portable electronic device is performed; and
    an optical sensing element arranged beside said lens, wherein said image of said object is projected on said optical sensing element.

4. The distance measuring method according to claim 1 wherein said portable electronic device further comprises a display screen for showing said current object distance value corresponding to said current lens moving step number.

5. The distance measuring method according to claim 1 wherein said portable electronic device is a digital camera or a camera phone.

6. A portable electronic device for measuring a distance of an object by performing an auto focus function, said portable electronic device comprising:
    an image pickup module for performing said auto focus function to capture said image of said object, said image pickup module comprising:
        a lens that is movable while said auto focus function is performed;
        an optical sensing element arranged beside said lens, wherein said image of said object is projected on said optical sensing element; and
        a transmission mechanism connected to said lens for moving said lens while said auto focus function of said portable electronic device is performed; and
    a distance measuring program for acquiring an object distance value while said image pickup module performs said auto focus function to capture said image of said object, wherein said distance measuring program comprises a distance look-up table that is established by correlating a plurality of lens moving step numbers with corresponding object distance values, said lens is moved by said transmission mechanism while said image pickup module performs said auto focus function to capture said image of said object, so that said distance measuring program obtains a current lens moving step number required for performing said auto focus function, and a current object distance value corresponding to said current lens moving step number is acquired according to said distance look-up table,
    wherein said distance look-up table includes a near distance threshold value, wherein if said current lens moving step number is larger than said near distance threshold value, said current object distance value corresponding to said current lens moving step number is acquired according to a Gaussian imaging formula, and if said current lens moving step number is smaller than or equal to said near distance threshold value, said current object distance value corresponding to said current lens moving step number is acquired according to a practical measurement.

7. The portable electronic device according to claim 6 wherein said Gaussian imaging formula is expressed as: $1/p$ +1/q =1/f, where p is a distance from said object to said lens, q is a distance from said image of said object to said lens, and f is a focal length of said portable electronic device.

8. The portable electronic device according to claim 6 wherein said portable electronic device further comprises a display screen for showing said current object distance value corresponding to said current lens moving step number.

* * * * *